Patented Nov. 18, 1924.

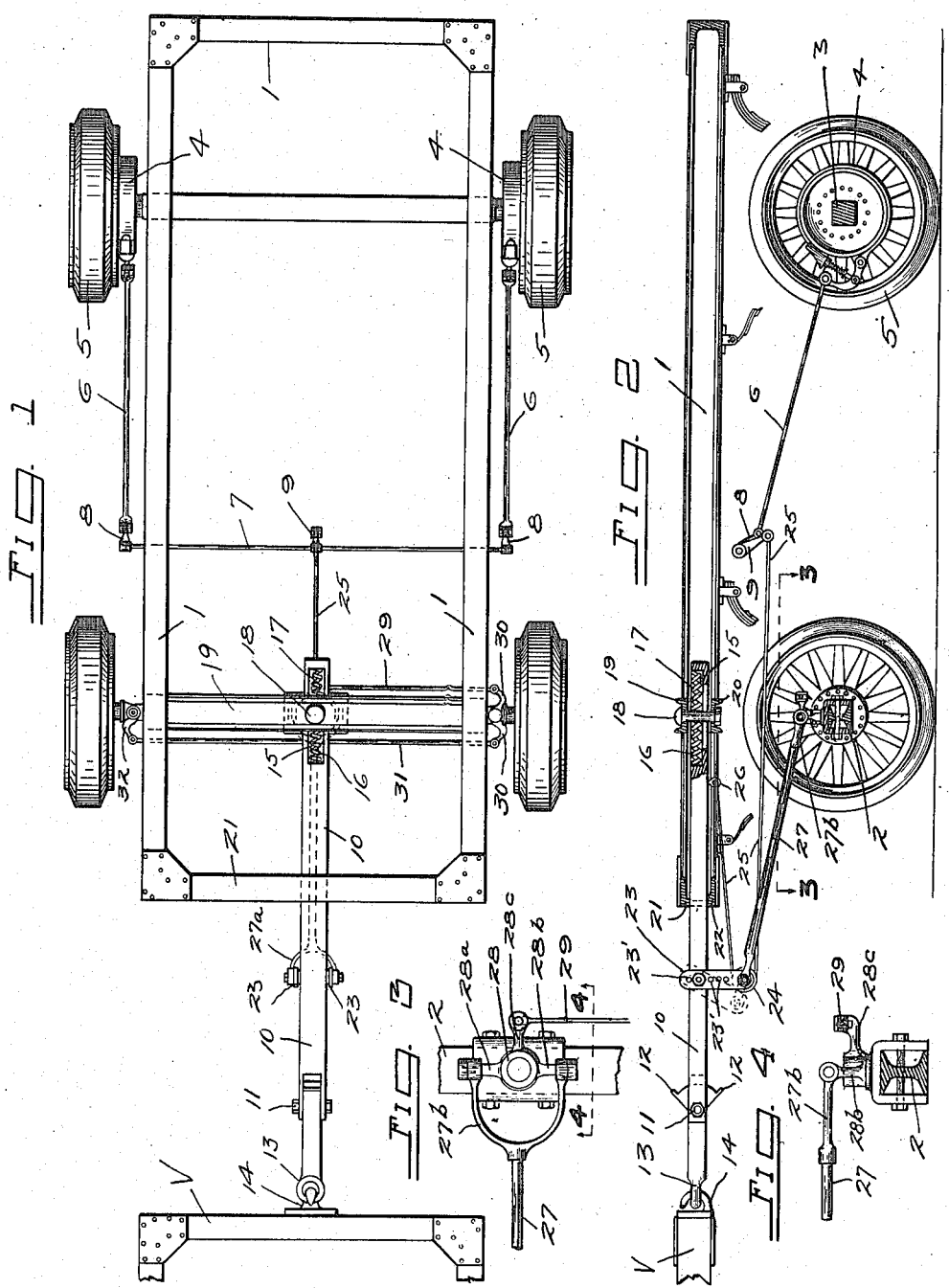

1,515,893

UNITED STATES PATENT OFFICE.

LOUIE S. TAYLOR, OF LOS ANGELES, CALIFORNIA.

TRAILER COUPLING AND BRAKE MECHANISM.

Application filed August 16, 1923. Serial No. 657,647.

*To all whom it may concern:*

Be it known that I, LOUIE S. TAYLOR, a citizen of the United States, residing in the city of Los Angeles, county of Los Angeles, and State of California, have invented certain new and useful Improvements in Trailer Coupling and Brake Mechanism, of which the following is a specification.

My invention relates to coupling mechanism for connecting trailers to other vehicles having in combination therewith means for automatically applying the brakes of the trailer as it approaches the other vehicle, thus preventing the trailer from being moved forwardly with a thrust against the motor vehicle when the former stops quickly.

The principal object of my invention is to provide a simplified mechanism which can be readily applied to a trailer, with the usual simple connection between the end of the tongue of the trailer and the motor or other vehicle, thus eliminating any necessity for other connections between the trailer and the other vehicle. In other words, the trailer tongue and its connection with the trailer chassis and with the trailer brake mechanism is complete in itself and the only connection between the trailer and the motor or other vehicle is the coupling of the end of the trailer tongue with the hook or pin on said motor or other vehicle.

In order to fully describe my invention, I have illustrated one practical embodiment thereof on the accompanying sheet of drawings which I will now describe. In the drawings,—

Figure 1 is a top plan view of a trailer, showing the rear end of another vehicle to which it is connected, with my invention on the trailer;

Figure 2 is a side elevation thereof, with parts in section;

Figure 3 is a fragmentary top plan view of a form of steering rod connection on the front axle of the trailer; and Figure 4 is a vertical sectional view thereon on the line 4—4 of Figure 3.

Referring more in detail to the drawings, 1, designates a trailer frame, 2 the front axle thereof, 3, the rear axle thereof, 4 the brake bands on the rear wheels, 5, 5, of said trailer, with the connecting rods, 6, 6, extending therefrom to the cross rod, 7, having the arms 8, 8, at its opposite ends and to which the connecting rods 6, 6, are connected. On the middle of said cross rod, 7, is a crank arm or lever 9, by means of which said brake mechanism is operated in a manner hereinafter described.

A trailer tongue 10, is jointed, as at 11, to turn on a horizontal axis, with limit stops, 12, 12, clearly shown and well understood. The end of the trailer tongue is provided with an eye, 13, adapted to hook over a hook, 14, on the rear end of another vehicle to which the trailer is coupled. This is the only connection between the trailer and the other vehicle. The rear end of said trailer tongue is provided or formed with a longitudinally extending opening therein, as at 15, in which are two coiled springs, 16 and 17, on the opposite sides front and rear, of a coupling pin, 18, through the members 19 and 20, of the trailer frame, as clearly understood from Fig. 2. The trailer tongue moves laterally between the upper and lower frame members, 21 and 22, which may be of any desired form which will provide a support for the tongue and permit it to swing horizontally in turning. Pivotally suspended from said trailer tongue, is a lever, 23, 23, made for vertical adjustment to lengthen or shorten the leverage, as indicated, by the holes, 23', and provided at its lower end with an anti-friction device, such as a pulley, 24, around which passes an operating cable, 25, extending from the lever 9, on the cross rod 7, and the other end of which operating cable is connected to the trailer tongue, as at 26.

A combination steering rod and brake operating rod 27, is provided at its forward end with a fork, 27ª, and pivotally connected to said levers 23, 23, on the tongue. The other end of said rod is also provided with a fork, 27ᵇ, connected with two of the arms, 28ª, and 28ᵇ of a three armed member 28, mounted to the axle 2, of said trailer, the third arm, 28ᶜ, of which member is connected by a link or rod, 29, to the steering levers 30, 30, at one end of the axle, 2, with a connecting link, 31, across to the other steering lever, 32, at the other end of the axle, as shown, and as will be readily understood, for this is the usual steering connection for steering the front wheels of a vehicle.

The use and operation of the invention may be briefly described as follows:

When pull is applied to the trailer tongue, the spring 17 at the rear side of the coupling pin 18, is compressed and the pull is thus yieldingly applied to the pin 18, and to the trailer frame. The operating cable 25, being connected to the tongue, as at 26, is left without any strain and the brake mechanism is not set, but is free and the trailer follows the motor or other vehicle, V. In case the motor truck, or other vehicle, V, stops, any movement of the trailer towards said motor vehicle, would cause the trailer frame to move forwardly compressing the front coiled spring, 16, in front of the pin 18, and the relative movement of the trailer frame is forwardly over the trailer tongue and forwardly relative to the connection of the operating cable 25, at the point 26, on the tongue. As the trailer moves forwardly, the rod, 27, is also thrust forwardly, moving the suspended arm or levers 23, 23, forwardly, as indicated in dotted lines, Fig. 2, thus drawing the operating cable 25 forwardly, and applying the brakes, through the usual connections, as described and identified. The rod 27, and its connections, also operate to steer the front wheels of the trailer in the usual and well known manner.

Thus I have provided a very simple, practical and efficient means for automatically applying and releasing the brakes of a trailer, as it moves toward or away from the vehicle to which it is coupled, and while I have illustrated one practical embodiment thereof on the accompanying drawings, I do not limit my invention to the details shown for explanation purposes, except as I may be limited by the hereto appended claims.

I claim:

1. In combination with a trailer and its brake mechanism, a coupling member connected with said trailer with a limited longitudinal movement relative thereto at its place of connection, a flexible brake operating member extending from said brake mechanism around a part carried by said coupling member and connected to said coupling member rearwardly of said part, said part being a pulley movably mounted on said coupling member, a thrust connecting member from said trailer to said part, whereby movement of said trailer relative to its coupling member moves said part and said flexible brake operating member, for the purpose referred to.

2. In combination with a trailer and its brake mechanism, a coupling member connected with said trailer at one end with a limited longitudinal movement relative thereto at its place of connection, spring means rendering said connection yielding, an anti-friction element movably mounted on said coupling member, a flexible brake operating element extending from said brake mechanism around said anti-friction element and connected to said coupling member rearwardly of said anti-friction element, a thrust member connecting the trailer with said anti-friction element, whereby movement of the trailer relative to the coupling member moves said anti-friction element and said flexible brake operating element for setting and releasing said brake mechanism.

3. In combination with a trailer and its brake mechanism, a coupling member jointed to hinge about a horizontal axis and at one end connected with said trailer with a limited movement relative thereto at its place of connection, a member carried by said coupling member and movable relative thereto, a thrust member from said trailer to said carried member, and an element from said carried member to said brake mechanism, whereby relative movement of said trailer and said thrust member as to the coupling member moves said carried member and sets or releases said brake mechanism.

4. In combination with a trailer and its brake mechanism, a coupling member, means connecting said coupling member to said trailer to permit a limited relative movement of the trailer longitudinally of said coupling member, a member mounted on said coupling member and movable relative thereto, a connecting member therefrom to said brake mechanism, and a connecting rod from the trailer to said member on said coupling member, whereby movement of the trailer relative to said coupling member operates to set and release said brake mechanism.

5. In combination with a trailer and its brake mechanism, a coupling member, means connecting said member to said trailer to permit a limited movement of the trailer relative thereto, spring means to render said relative movement resilient, a pulley movably mounted on said coupling member, a flexible brake operating member from said brake mechanism around said pulley and attached to said coupling member, and a connecting rod from said trailer to said pulley, whereby movement of the trailer relative to the coupling member moves said pulley and pulls or releases said flexible brake operating member.

6. In combination with a trailer and its brake mechanism, of a tongue connected to said trailer to have a movement relative thereto longitudinally thereof, a movable member on said tongue, a connection from said movable member to said brake mechanism for operating the latter, and a connecting rod from said trailer to said movable member, whereby movement of said trailer relative to said tongue, moves said movable member and its connection to the brake mechanism for setting or releasing the latter.

7. In connection with a trailer and its brake mechanism, a tongue yieldingly connected to said trailer to have a limited longitudinal movement relative thereto, a movable member on said tongue, a connection from said movable member to said brake mechanism for operating the latter, a thrust member from said trailer to said movable member for moving the latter when said trailer moves relative to said tongue, to set and release said brake mechanism.

8. In combination with a trailer and its brake mechanism, a tongue connected to said trailer to have a limited longitudinal movement relative thereto, a movable member on said tongue, a connection from said movable member to said brake mechanism for operating the latter, a combination thrust and steering member from said trailer to said movable member for moving the latter and for steering the wheels of said trailer, whereby movement of the tongue horizontally turns the wheels of the trailer and movement of the trailer relative to the tongue operates to set and release said brake mechanism.

9. In combination with a trailer and its brake mechanism, a tongue, means for yieldingly connecting it to said trailer to permit a limited movement thereof relative to said trailer, a movable member on said tongue, a connection from said movable member to said brake mechanism for operating the latter, a combination thrust member and steering member pivotally connected to said movable member at one end and pivotally connected to the axle of said trailer at its other end, connections from said member at its axle end for steering the wheels of said trailer, substantially as described.

10. In combination with a trailer and its brake mechanism, a tongue jointed intermediate its ends to hinge on a horizontal axis, means yieldingly connecting one end of said tongue to said trailer to permit a limited movement thereof relative to said trailer, an arm on said tongue with a pulley at its lower end, a flexible connection from said brake mechanism around said pulley and connected to said tongue, and a combination thrust rod and steering member connected at one end to the arm on said tongue and at its other end connected to the axle of said trailer, with connections therefrom to the wheels of said trailer, whereby movement of the tongue horizontally turns the wheels of the trailer and movement of the trailer relative to the tongue moves said arm on said tongue and operates said flexible connecting means to set and release said brake mechanism, substantially as described.

Signed at Los Angeles, Los Angeles County, California, this 9th day of Aug., 1923.

LOUIE S. TAYLOR.

Witnesses:
W. R. LITZENBERG,
MARGUERITE L. WILBUR.